US009631865B1

(12) United States Patent
Rivas Alvarez

(10) Patent No.: US 9,631,865 B1
(45) Date of Patent: Apr. 25, 2017

(54) NATURAL GAS TO LIQUID FUELS, LIQUID NATURAL GAS AND COMPRESSED NATURAL GAS

(71) Applicant: Patents and Innovations Technologies International LLC, Mandan, ND (US)

(72) Inventor: Victor Rivas Alvarez, Lincoln, NE (US)

(*) Notice: Subject to any disclaimer, the term of this patent is extended or adjusted under 35 U.S.C. 154(b) by 246 days.

(21) Appl. No.: 14/163,628

(22) Filed: Jan. 24, 2014

Related U.S. Application Data

(60) Provisional application No. 61/756,270, filed on Jan. 24, 2013.

(51) Int. Cl.
*C10G 2/00* (2006.01)
*F25J 1/00* (2006.01)
*B23K 26/0622* (2014.01)

(52) U.S. Cl.
CPC .............. *F25J 1/0022* (2013.01); *C10G 2/35* (2013.01); *B23K 26/0624* (2015.10); *Y10T 29/49352* (2015.01)

(58) Field of Classification Search
CPC ....... F25J 1/0022; C10G 2/35; F28F 2255/20; F28F 2260/02
See application file for complete search history.

(56) References Cited

U.S. PATENT DOCUMENTS

| | | | | |
|---|---|---|---|---|
| 7,000,427 B2 * | 2/2006 | Mathias | ................. | F25J 1/0022 165/165 |
| 8,238,098 B1 * | 8/2012 | Rivas | ................. | H01L 21/4871 165/185 |
| 8,279,579 B1 * | 10/2012 | Rivas Alvarez | ... | B23K 26/0078 361/502 |
| 2008/0210596 A1 * | 9/2008 | Litt | ...................... | B01J 19/0093 208/20 |

\* cited by examiner

*Primary Examiner* — Sarang Afzali
*Assistant Examiner* — Ruth G Hidalgo-Hernandez
(74) *Attorney, Agent, or Firm* — James Creighton Wray

(57) ABSTRACT

A method and apparatus for the liquefaction of natural gas or conversion of other gases to liquids that uses nanosecond or femtosecond pulse laser machined structures on surfaces of heat exchangers. The heat exchanger has metal plate and plate fin surfaces with increased surface area to volume ratio from the nanosecond or femtosecond pulse laser machined structures on its surfaces. Heat transfer and cooling are accelerated by exposing the gas to nanosecond or femtosecond pulse laser nanomachining structures. Fluid refrigerant flows through the structures in the heat exchanger metal plate and plate fins, and exchanges heat with refrigerant flowing through the structures.

17 Claims, 6 Drawing Sheets

Aluminium plate fin material before Laser Nano Machining

NATURAL GAS TO LIQUID FUELS, LIQUID NATURAL GAS AND COMPRESSED NATURAL GAS

This application claims the benefit of U.S. Provisional Application No. 61/756,270, filed Jan. 24, 2013, which is hereby incorporated by reference in its entirety as if fully set forth herein.

SUMMARY OF THE INVENTION

The invention provides combined gas to liquids and liquid natural gas (GTL & LNG) using Rivas nanosecond or femtosecond pulse laser machining technologies.

Frack and gas flaring are here to stay; also bio-gas different sources are here to stay. Therefore, there are great opportunities for innovations, American jobs potential and energy independence.

The new Rivas Nanosecond or Femtosecond Pulse Laser machining inventions provide innovative changes for better processes and higher levels of profitability in the petrochemical industry thanks to nanotechs. The following patent disclosures are included in their entirety as though fully set forth herein:

Rivas U.S. Pat. No. 8,238,098 describes laser machined materials using shielding femtosecond pulse laser for transforming technologies to enhanced thermal ablated femtosecond and optical properties for nanostructures increased surface area to area with enhanced heat dissipation and emissivity and electromagnetic radiation.

Rivas U.S. Pat. No. 8,279,579 describes energy transforming, storing and electronic components and electrodes. Storing and shielding devices have pulse laser machined developed for substantially increasing surface area.

This new invention has adapted these patents from micro-nanoelectronics to be applied in the energy and chemical industries, particularly the petrochemical industry with special application in gas to liquid fuels conversion and liquefaction of gases, in particular natural gas.

The following is a synopsis to take care of the flaring problem around the world.

The principal is the use of femtosecond pulse laser machining technologies to innovate current processes in the gas to liquid fuels conversions and in the liquefaction of gases, in particular natural gas.

The use of nanosecond or femtosecond pulse laser machining technologies to increase surface area of heat exchangers and fins to enhanced surface area to volume ratio in the heat exchangers used in the energy and chemical industries, particularly in the petrochemical industry, to convert methane into liquid fuels and to enhance liquefaction of gases, in particular natural gas, at attractive cost performance ratio and profitability, also the incorporation of these technologies to design and built micro-small skid mounted mobile gas to liquid fuels and liquefaction of natural gas.

The major sources of methane for this project are pipeline gas, coal-mine methane, landfill bio-gas and stranded well gas digester bio-gas. All these sources have a common major molecule $CH_4$ methane, a major component in natural gas.

When it comes to stranded well gas, particularly due to fracking and flaring or other sources, there are two options:
A) Conversion of methane to synthetic crude oil the two by-products water $H_2O$ and methane $CH_4$. Both can go back to the system (steam reforming Fisher-Tropsch process) for syngas followed by synthetic crude oil, water and methane. Then the cycle repeats again on and on.

B) The other option is liquefaction of natural gas (methane) from the stranded well gas or other sources. Natural gas can be used as a refrigerant for the heat exchanger and also as fuel to run the operation, particularly the compressor. In both options removal of unwanted materials needs to occur (dry gas) prior to the optional processes.

Regardless of which process is selected, the current trend is towards GTL & LNG. Both require improved reliable cost effective technologies. The present classical scheme of ongoing GTL & LNG technologies has been pushed to its limits.

It is well known high surface area to volume ratio speed heat transfer and chemical reactions increase GTL & LNG productivity.

Innovation for GTL & LNG Processing Plants.

Systems based in Rivas nanosecond or femtosecond pulse laser nanomachined heat exchangers technology have the potential to transform the steam methane reforming-Fischer Tropsch (SMR-FT) & LNG processes by greatly enhancing surface area to volume ratio by reducing the size of heat exchangers and chemical reactors.

This nanotechnology has many parallels with microelectronics because it can shrink processing hardware while improving performance. Devices using nanomachining technology are characterized with typical dimensions in the range of nanometers. Heat transfer and chemical processes are potentially accelerated 10 to 1000 fold by reducing heat and mass transfer distances and also reducing contact time. Nanomachining heat exchangers offer enhanced heat and mass transfer.

Nanosecond or femtosecond pulse laser machining technology is a new approach suited for carrying out catalytic reactions that are either endothermic such as SMR, or exothermic such as FT synthesis. This is possible because increasing of aspect ratio in the catalytic particles to point of producing nanoparticles.

Liquefaction of natural gas uses nanosecond and/or femtosecond pulse laser machining structures on the metal plate fins in the heat exchangers for cooling fluids in the heat exchanger: The process is described by flowing a fluid refrigerant through the nanostructures in the heat exchanger metal plate and plate fins, exchanging heat with the refrigerant flowing through the nanostructures in the heat exchanger metal plate and plate fins, exchanging heat with the refrigerant flowing through the refrigerant nanostructures, the product exiting the heat exchangers nanostructures being cooler than the product entering the heat exchanger's nanostructures. This nanotech process has a wide range of applications in the energy and chemical industries including the liquefaction of natural gas.

The femtosecond pulse laser machining technologies enhance surface areas in gas to liquid fuels and to liquefaction of natural gas LNG. The invention can be a combined process doing both in a processing facility or individual also the plants can be micro-small skid mounted mobile processing for GTL & LNG plants.

In its simplest of terms, the three basic steps of the liquefaction process are:
1) removal of impurities and recovery of gas liquids;
2) refrigeration of the gas until it liquefies; and
3) movement of the LNG to storage and ultimately transportation to market.

Nanosecond or femtosecond pulse laser nanomachining the heat exchanger provides a beneficial impact by increasing surface area with critical dimensions in the nanometer and femtometer ranges compared to macro-micro range conventional heat exchanger surface area structures. The invention has more space available for the methane molecules to interact with the metal plate fins to liquefy the gas at a very fast rate. It is also possible to build smaller heat exchangers without a reduction in LNG production. The figures show scanning electron microscope (SEM) images of the surface area of an aluminum fin on the heat exchanger which is flat with low surface area to volume ratio. Other SEMs show the same fin after laser machining with Rivas femtosecond pulse laser technologies as described in U.S. Pat. No. 8,238,098 Rivas et al. and U.S. Pat. No. 8,279,579 Rivas et al. having a very high surface area-to-volume ratio.

The invention covers both processes for the gas to liquids and for the liquefaction of natural gas LNG.

Nanosecond or femtosecond pulse laser nanomachined technologies build micro-small skid mounted mobile processing plants to produce 1000+ gallons per day of liquid natural gas.

The high levels of surface area to volume ratio allow the faster conversion of the natural gas from its gaseous state to the liquid state with smaller heat exchangers, condenser and cooler. Nanostructures cool at a much faster rate than monolithic macro components and materials.

Incorporation of femtosecond pulse laser nanomachining technologies makes the LNG process faster and attractive levels of profitability possible, particularly at the micro-small production levels.

These inventions also apply to all kind of cryogenic liquefiers in the energy and chemical industries. Nanomachining may be on the inside as well as the outside of the heat exchangers.

Converting gas to liquids and for the liquefaction of natural gas LNG uses a heat exchanger with metal plates and fin surfaces. The surface areas are increased relative to heat exchange volume by providing nanosecond or femtosecond pulse laser nanomachining and femtomachining of surfaces of the heat exchanger. Gases are exposed to the surfaces of the heat exchanger. The gas is cooled through heat transfer from exposing the gases to the surfaces of the heat exchanger having nanosecond or femtosecond pulse laser nanomachining structures.

A fluid refrigerant is flowed through the nanosecond or femtosecond pulse laser nanomachining structures in the heat exchanger metal plate and plate fins. Heat is exchanged from the gas with the refrigerant flowing through the nanosecond or femtosecond pulse laser nanomachining structures. The nanosecond or femtosecond pulse laser nanomachining structures are on inside refrigerant-contacting surfaces of the heat exchanger. The nanosecond or femtosecond pulse laser nanomachining structures are on outside natural gas-contacting surfaces of the heat exchanger.

The nanosecond or femtosecond pulse laser machined structures are on the surfaces of the metal plates. The nanosecond or femtosecond pulse laser machined structures also are on the surfaces of the plate fins. The plate fins are aluminum in one embodiment.

The nanosecond or femtosecond pulse laser machined structures are machined at 45° angles. In one embodiment, the nanosecond or femtosecond pulse laser machined structures are formed on a carbon film on a metal substrate.

Cooling coils may be provided in the heat exchanger. Surface area to volume ratio is increased on surfaces of the cooling coils by providing nanosecond or femtosecond pulse laser machined structures on the surfaces of the cooling coils. The nanosecond or femtosecond pulse laser machined structures form tridimensional structures on the surfaces of the plate fin. The heat exchanger is used with nanosecond or femtosecond pulse laser machined structures in steam methane reforming (SMR) processes. The heat exchanger is used with nanosecond or femtosecond pulse laser machined structures in Fischer-Tropsch (FT) synthesis processes.

Heat exchange surfaces are nanomachined, femtomachined or nanomachined and femtomachined. The nanomachined, the femtomachined or the nanomachined and femtomachined surfaces are assembled in a heat exchanger. The heat exchange surfaces are cooled. Gas is provided to the heat exchanger. The nanomachined, the femtomachined or the nanomachined and femtomachined surfaces are contacted in the heat exchanger with the gas, condensing the gas into a liquid and storing the liquid, In one example, natural gas is provided to the heat exchanger. The nanomachined, the femtomachined or the nanomachined and femtomachined surfaces are contacted in the heat exchanger with the natural gas. The natural gas is condensed into liquid natural gas. The liquid natural gas is stored.

In one example, raw natural gas is provided to the heat exchanger. The nanomachined, the femtomachined or the nanomachined and femtomachined surfaces are contacted in the heat exchanger with the natural gas. Components are separated from the raw natural gas. The liquid natural gas is obtained, and the liquid natural gas is stored.

The invention has gas-contacting surfaces for a heat exchanger. The gas-contacting surfaces have roughened surfaces machined by nanomachining, femtomachining or nanomachining and femtomachining. The invention has a heat exchanger in which the gas-contacting surfaces are mounted. The heat exchanger is a natural gas purifier or condenser having an inlet for natural gas and having an outlet for liquefied natural gas.

These and further and other objects and features of the invention are apparent in the disclosure, which includes the above and ongoing written specification, with the drawings.

DETAILED DESCRIPTION

Figure 1:
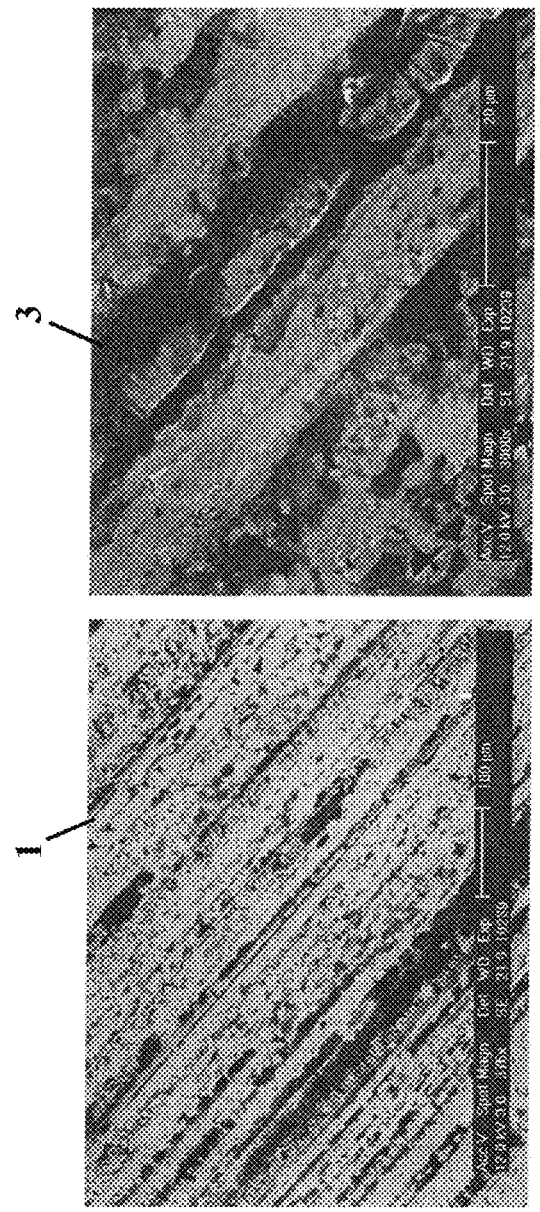
FIG. 1 shows aluminum plate and fin material before laser machining.

FIG. 1 shows SEM images of pre-processed aluminum material. FIG. 1 also shows aluminum plate fin material before laser nanomachining. In FIG. 1, image 1 was taken at 375× magnification. Image 3 was taken at 3000× magnification. For comparison scales are marked at 100 µm and 20 µm, respectively.

Figure 2:
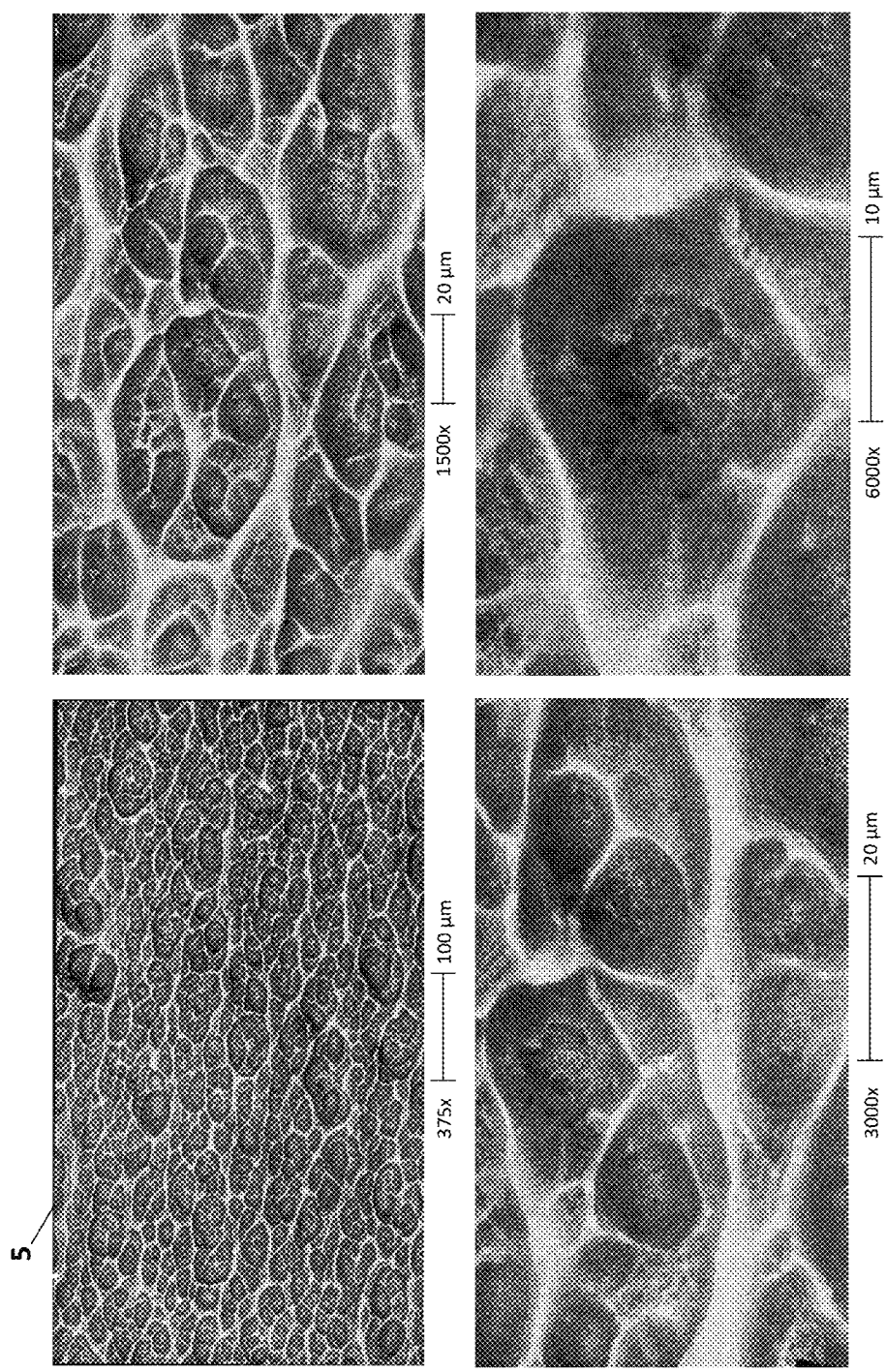
In FIG. 2 aluminum fins after laser nanomachining the gas molecules have a large area to be attached in the tridimensional fin's nanostructures. Less material means more volume of gas is treated.

FIG. 2 shows SEM images of aluminum sample 1. FIG. 2 shows aluminum sample 5 after femtosecond pulsed laser machining at four different magnifications, 375×, 1500×, 3000×, and 6000×. For comparison in each sample three different scale lengths are shown, 100 µm, 20 µm, and 10 µm. Aluminum fins after laser nanomachining the gas molecules have a large area to be attached in the tridimensional fin's nanostructures. Less material means more volume.

Figure 3:
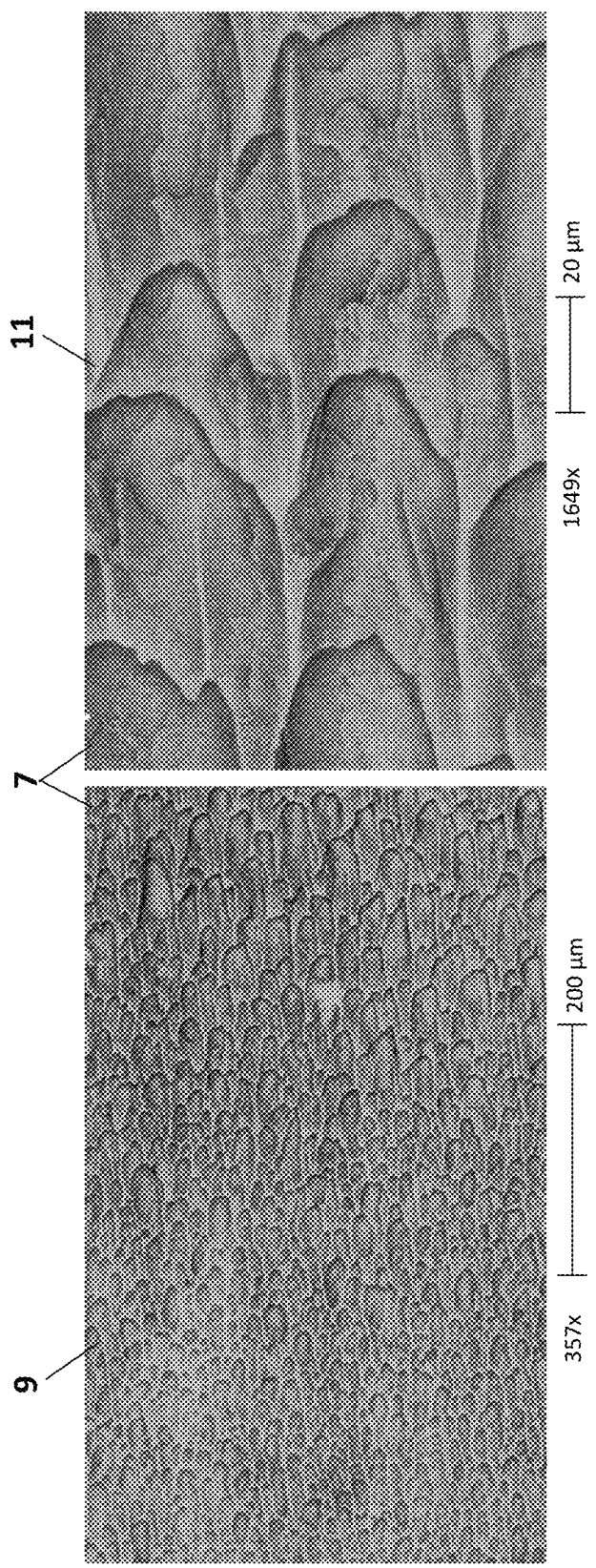
FIG. 3 show that the natural gas moves along with minimum drag and high surface area surface area per volume for gas molecules to contact.

FIG. 3 shows machining of aluminum (Al) at a 45° angle. FIG. 3 shows an aluminum sample 7 at 357× magnification 9 and 1649 magnification 11 after machining with a femtosecond pulsed laser. In the images the laser machining was performed with the Al sample at a 45° angle. The machined surface has a "fish scale" appearance. The angle of laser machining is one of the parameters that needs to be explored in the optimization for different applications. The natural gas moves along with minimum drag and high surface area surface area per volume for gas molecules to go.

Figure 4:
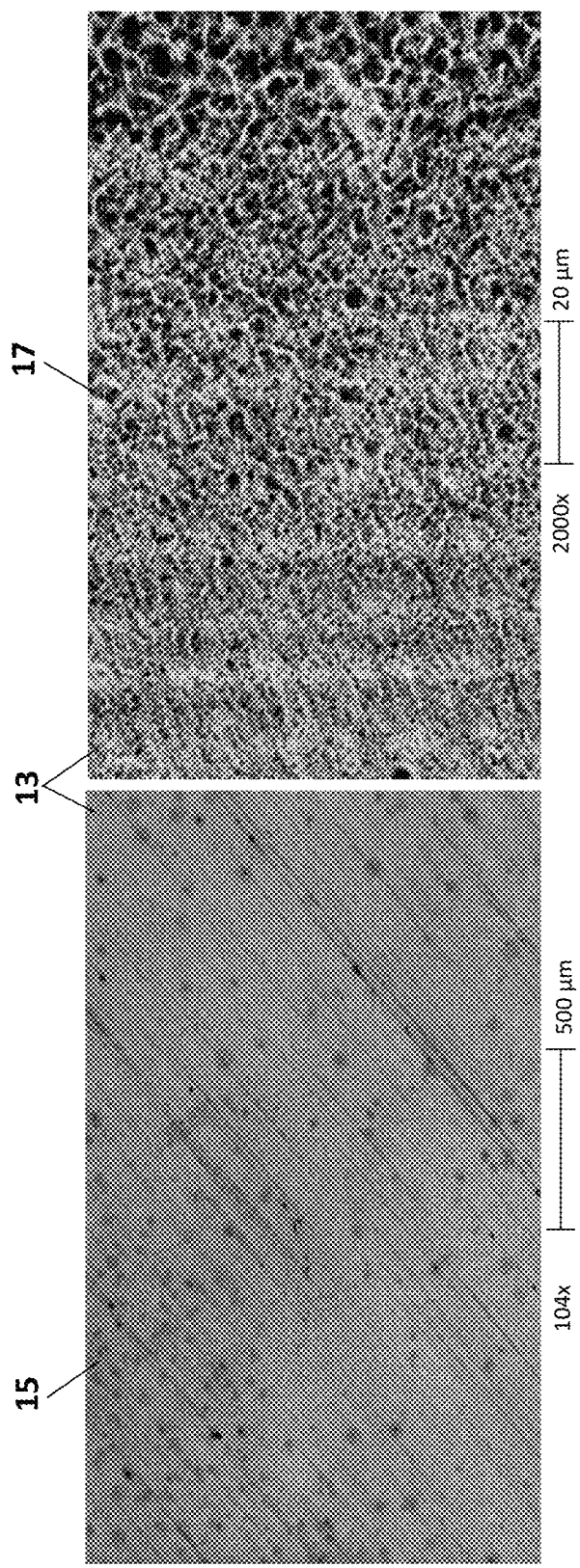
In FIG. 4 the Al heat exchanger fin's surface area in the left is many times larger than the one in the right because it has been laser machined, having more nanostructures for many more natural gas molecules to be attached/stored.

FIG. 4 shows SEM images of an aluminum substrate 13 before machining 15 at 104× magnification and after machining 17 at 2000× magnification, respectively. For comparison, lengths of 500 µm and 20 µm are marked. On the left is an SEM image of the Al substrate before being machined. Notice how smooth it appears. On the right is an SEM image of the Al substrate after being machined. Notice how the surface appears rough. The Al heat exchanger fin's surface area in the left is many times larger than the one in the right because it has been laser machined having more nanostructures for many more natural gas molecules to be attached/stored.

Figure 5:
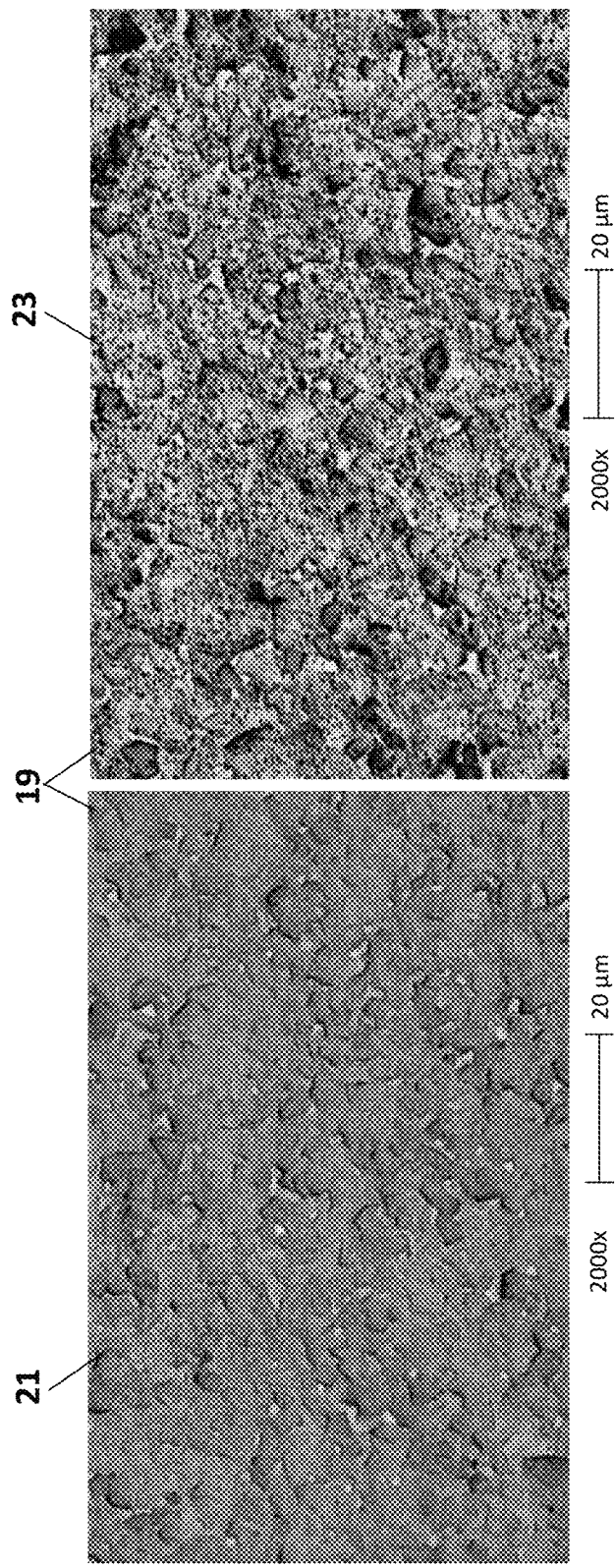
FIG. 5 shows laser nanomachining of activated carbons to clean natural gas prior to liquefaction. There is more surface area per volume for natural gas's contaminants to be attached in the right, better product.

FIG. 5 shows machining of a carbon film on a metal substrate. FIG. 5 shows SEM images of a carbon film 19 on a metal substrate before laser machining 21 and after laser machining 23 at 2000× magnification. On the left is an SEM image of the carbon film before laser machining was performed. On the right is an SEM image of that same carbon film after the laser machining has been done. Notice how the image on the left appears smooth with square and triangle shapes, but the image on the right looks dirty with small bumps all over. These bumps are due to the femtosecond pulsed laser machining and are made up of micro and nanostructures that have been formed. Laser nanomachining of activated carbons to clean natural gas prior to liquefaction is shown. There is more surface area per volume for natural gas contaminants to be attached in the right, better product.

In one example, the heat exchange material, e.g. aluminum, is supplied in a rolled sheet. As the sheet is unrolled it is subjected to nanomachining and femtomachining concurrently or sequentially before the sheet is formed into heat exchanger parts, plates and fins and joined with other heat exchanger parts in a heat exchanger.

Figure 6:
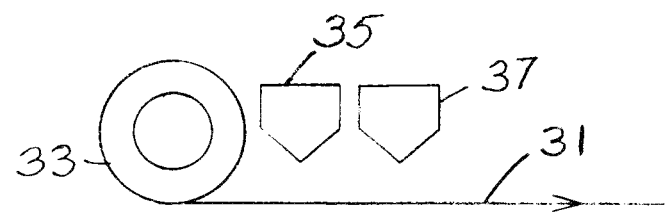
FIG. 6 schematically shows an aluminum sheet being unrolled and subjected to nanomachining and femtomachining.

FIG. 6 schematically shows an aluminum sheet 31 being unrolled 33 and subjected to nanomachining 35 and femtomachining 37.

Figure 7:
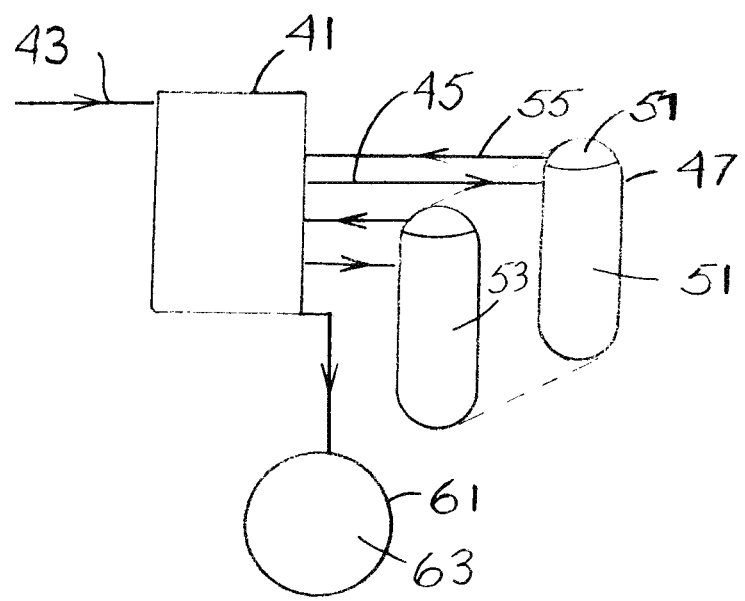
FIG. 7 schematically shows a heat exchanger having a raw natural gas input and providing separation and collection of component materials, return of natural gas and storage of liquefied natural gas.

FIG. 7 schematically shows a heat exchanger 41 having a raw natural gas input 43 and providing separation 45 and collection 47 of component materials 51, 53, return 55 of natural gas 57 and storage 61 of liquefied natural gas 63.

The laser nanomachining and femtomachining facility increases a heat exchanger's surface areas with aluminum plate fins and cooling coils for high surface area per volume unit surface area per volume for applications in liquefaction of gases to increase productivity with less weight. The new small LNG mobile processing plants provide 5000 or more gpd.

The laser machined heat exchanger increases plate aluminum fin surface area amplified. Nanosecond pulse laser machining heats the plate or fins and possibly distorts the material. Femtosecond pulse laser machining is a cool machining. The combination or sequence of the two nanosecond and femtosecond laser pulse provides more surface area with pits within pits or bumps on bumps.

A method is presented which converts gas to liquids and natural gas (GTL & LNG). In this method, a heat exchanger is provided with metal plate and plate fin surfaces. The surface area to volume ratio on surfaces of the heat exchanger is increased by providing nanosecond or femtosecond pulse laser machined structures on surfaces of the heat exchanger;

Gases are exposed to the surfaces of the heat exchanger. The gas is cooled through heat transfer from exposing the gases to the surfaces of the heat exchanger having nanosecond or femtosecond pulse laser machined structures. A fluid refrigerant flows through the nanosecond or femtosecond pulse laser machined structures in the heat exchanger metal plate and plate fins, and exchanges heat from the gas with the refrigerant flowing through the nanosecond or femtosecond pulse laser machined structures.

The nanosecond or femtosecond pulse laser machined structures can be formed on a carbon film on a metal substrate, aluminum metal plate, plate fins, or the like.

Cooling coils are provided in the heat exchanger. Surface area to volume ratio is increased on surfaces of the cooling coils by providing nanosecond or femtosecond pulse laser nanomachining structures on the surfaces of the cooling coils.

The nanosecond or femtosecond pulse laser nanomachining structures form tridimensional structures on the surfaces of the plate fin.

The heat exchanger can be used with nanosecond or femtosecond pulse laser nanomachining structures in steam methane reforming (SMR) processes.

The heat exchanger can be used with nanosecond or femtosecond pulse laser nanomachining structures in Fischer-Tropsch (FT) synthesis processes.

The new invention may be used with heat exchanger surfaces on plates, on fins and on plates and fins made of any heat exchanger material, for example aluminum, copper or any metal composites or other materials suitable for heat absorption and transfer.

In examples, the natural gas primarily is methane. Raw natural gas may include water vapor, hydrogen sulfate, carbon dioxide helium, and hydrocarbons including ethane, butane and pentane. The new heat exchanger surfaces may be used at well heads to separate some components, and final processing of the natural gas to pipeline quality may be done at central processing plants.

The invention is used in heat exchangers after filtering to remove impurities. The improved heat exchangers may be used to separate components and to provide liquid natural gas at well heads and central stations.

While the invention has been described with reference to specific embodiments, modifications and variations of the invention may be constructed without departing from the scope of the invention.

I claim:

1. A method to convert natural gas to liquid fuels and to liquid natural gas (LNG), the method comprising:

providing a heat exchanger with heat exchanger plates having surfaces;

increasing surface area to volume ratios on the surfaces of the heat exchanger plates by providing nanosecond or femtosecond pulse laser machined structures on surfaces of the heat exchanger plates;

exposing natural gas to the surfaces of the heat exchanger plates;

cooling the natural gas through heat transfer from exposing the natural gas to the surfaces of the heat exchanger having the nanosecond or femtosecond pulse laser machined structures; and converting the natural gas to the liquid fuels and to the liquid natural gas (LNG).

2. The method of claim 1, wherein the heat exchanger plates are metal plates, and further comprising providing the nanosecond or femtosecond pulse laser machined structures on surfaces of the metal plates.

3. The method of claim 2, further comprising plate fins on the metal plates and providing the nanosecond or femtosecond pulse laser machined structures on the surfaces of the plate fins.

4. The method of claim 3, wherein the nanosecond or femtosecond pulse laser machined structures form tridimensional structures on the surfaces of the plate fins.

5. The method of claim 3, wherein the plate fins are aluminum.

6. The method of claim 5, further comprising laser machining the nanosecond or femtosecond pulse laser machined structures of the plate fins at a 45° angle.

7. The method of claim 1, further comprising providing cooling coils in the heat exchanger.

8. The method of claim 7, further comprising increasing surface area to gas volume ratio on surfaces of the cooling coils by providing nanosecond or femtosecond pulse laser machined structures on the surfaces of the cooling coils.

9. The method of claim 1, further comprising flowing a fluid refrigerant through the nanosecond or femtosecond pulse laser machined structures on the heat exchanger plates, and exchanging heat from the natural gas with the fluid refrigerant flowing through the nanosecond or femtosecond pulse laser machined structures.

10. The method of claim 1, wherein the nanosecond or femtosecond pulse laser machined structures are on inside surfaces of the heat exchanger.

11. The method of claim 1, wherein the nanosecond or femtosecond pulse laser machined structures are on outside surfaces of the heat exchanger.

12. The method of claim 1, further comprising forming the nanosecond or femtosecond pulse laser machined structures on a carbon film on a metal substrate.

13. The method of claim 1, further comprising using the heat exchanger with nanosecond or femtosecond pulse laser machined structures in steam methane reforming (SMR) processes.

14. The method of claim 1, further comprising using the heat exchanger with the nanosecond or femtosecond pulse laser machined structures in Fischer-Tropsch (FT) synthesis processes.

15. A method comprising:

providing heat exchange surfaces, nanomachining, femtomachining or nanomachining and femtomachining the heat exchange surfaces, assembling the nanomachined, the femtomachined or the nanomachined and femtomachined surfaces in a heat exchanger, cooling the heat exchange surfaces in the heat exchanger, providing a gas to the heat exchanger, and contacting the nanomachined, the femtomachined or the nanomachined and femtomachined surfaces in the heat exchanger with the gas, condensing the gas into a liquid and storing the liquid.

16. The method of claim 15, wherein the providing the gas comprises providing a natural gas to the heat exchanger, wherein the contacting comprises contacting the nanomachined, the femtomachined or the nanomachined and femtomachined surfaces in the heat exchanger with the natural gas, wherein the condensing comprises condensing the natural gas into a liquid natural gas, and wherein the storing comprises storing the liquid natural gas.

17. The method of claim 15, wherein the providing the gas comprises providing a raw natural gas to the heat exchanger, wherein the contacting comprises contacting the nanomachined, the femtomachined or the nanomachined and femtomachined surfaces in the heat exchanger with the raw natural gas, wherein the condensing comprises separating components from the raw natural gas, obtaining a liquid natural gas and storing the liquid natural gas.

* * * * *